March 1, 1966 C. K. BROWN 3,237,347
FORMING AND TESTING APPARATUS

Filed April 18, 1963 5 Sheets-Sheet 1

INVENTOR.
CHRISTOPHER K. BROWN
BY *R. J. Leek Jr.*
ATTORNEY

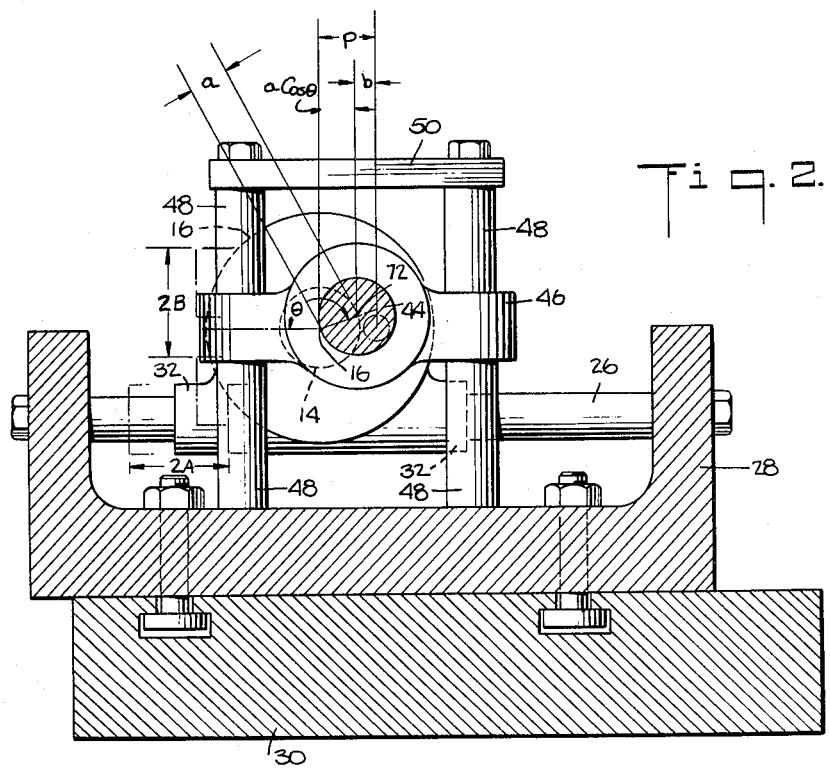
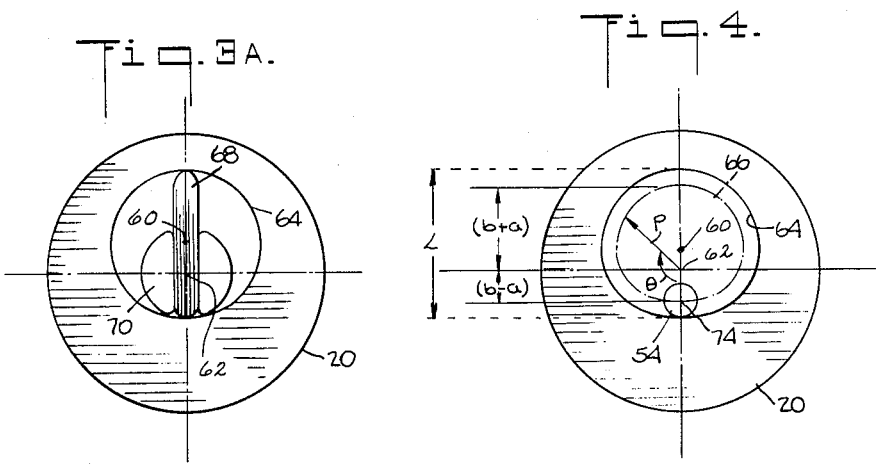

March 1, 1966 C. K. BROWN 3,237,347
FORMING AND TESTING APPARATUS
Filed April 18, 1963 5 Sheets-Sheet 3
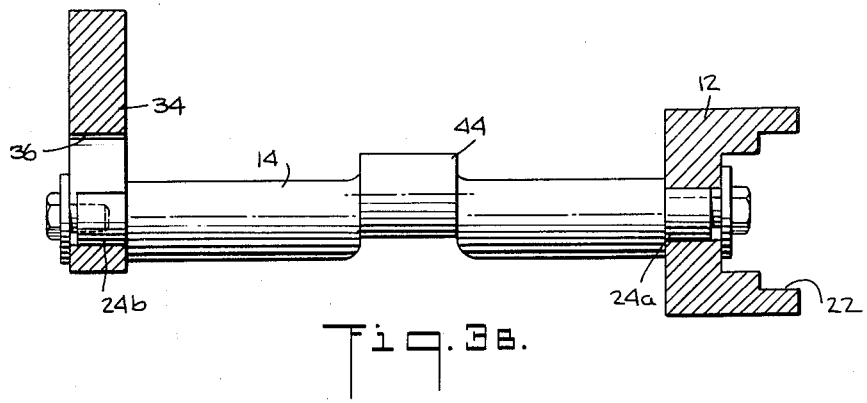
Fig. 3B.
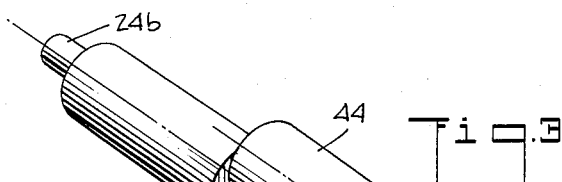
Fig. 3C.
Fig. 6.
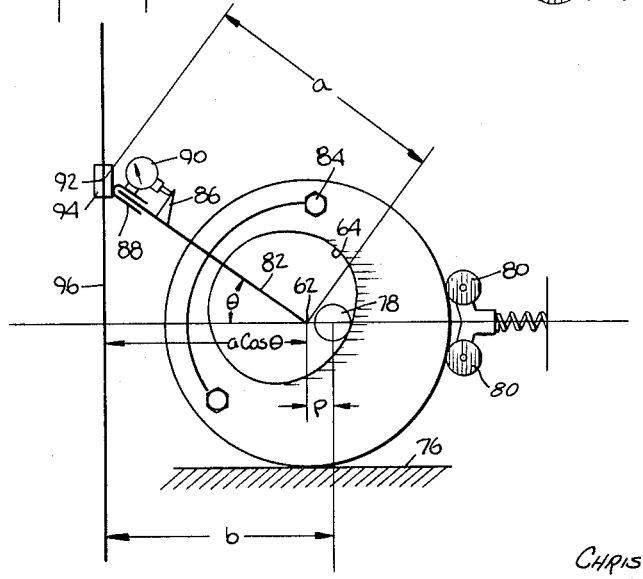
INVENTOR.
CHRISTOPHER K. BROWN
BY
ATTORNEY March 1, 1966  C. K. BROWN  3,237,347
FORMING AND TESTING APPARATUS
Filed April 18, 1963  5 Sheets-Sheet 4

$a$ = DISTANCE FROM CRANKSHAFT CENTER 62 TO ECCENTRIC CENTER 72
$b$ = DISTANCE FROM GRINDING WHEEL CENTER 74 TO VERTICAL PATH OF ECCENTRIC CENTER 72
$p = b - a \cos \theta$ Fig. 5A.
$\theta = 0$
$p = b - a \cos(0°)$
$= b - a(1)$
$= b - a$

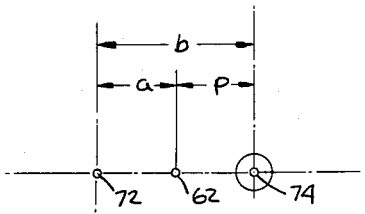

Fig. 5B.
$\theta = 90°$
$p = b - a \cos(90°)$
$= b - a(0)$
$= b$

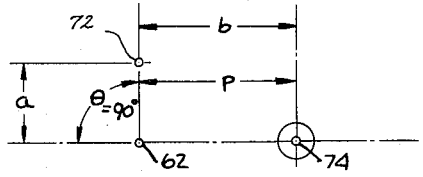

Fig. 5C.
$\theta = 180°$
$p = b - a \cos(180°)$
$= b - a(-1)$
$= b + a$

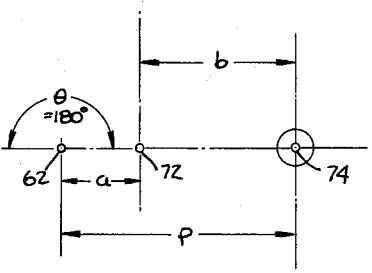

Fig. 5D.
$\theta = 270°$
$p = b - a \cos(270°)$
$= b - a(0)$
$= b$

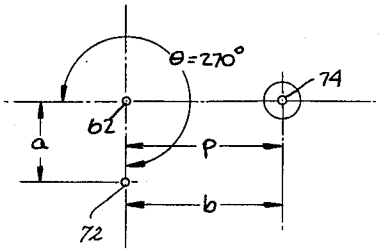

INVENTOR.
CHRISTOPHER K. BROWN
BY
ATTORNEY

United States Patent Office 3,237,347
Patented Mar. 1, 1966

3,237,347
FORMING AND TESTING APPARATUS
Christopher K. Brown, Sayre, Pa., assignor to Ingersoll-Rand Company, New York, N.Y., a corporation of New Jersey
Filed Apr. 18, 1963, Ser. No. 273,901
6 Claims. (Cl. 51—43)

This invention relates to impulse tools and more particularly to apparatus for forming and testing the contour of an eccentric cavity in the housing means of such impulse tools.

Heretofore, impulse tools of the type disclosed in U.S. patent applications Serial No. 115,714 filed June 8, 1961, now abandoned, by D. K. Skoog, Serial No. 158,838 filed December 12, 1961, now U.S. Patent 3,116,617, by D. K. Skoog and Serial No. 244,151 filed December 12, 1962, by D. K. Skoog et al. have been provided with an eccentric cavity or spindle blade guide aperture in the inner housing of such tools by means of a cam guided grinder. Errors in the machined contoured surface of the cam and back lash, looseness etc., in the connecting or driving mechanism produce corresponding inaccuracies in the cavity or guide aperture. Further if the size or dimensions of the cavity are changed a new cam must be produced, which new cam is expensive.

It is the general object of the present invention to avoid and overcome the foregoing and other difficulties of and objections to prior art practices by the provision of apparatus for forming and testing a cavity in the inner housing of an impulse tool which apparatus is simple, adjustable and permits the facile testing of the finished contour in the cavity.

The aforesaid objects of the present invention, and other objects which will become apparent as the description proceeds, are achieved by providing apparatus for positioning a work tool with respect to a work piece to permit such work tool to perform a work operation on a work piece, the apparatus having work piece holding means adapted to reciprocate in a first plane. Drive means are connected to the work piece holding means for rotating the work piece holding means. Positioning means are connected to the work piece holding means and are adapted to rotate with the work piece holding means. Slide means are connected to the positioning means to reciprocate the positioning means in a second plane perpendicular to the first plane, and work tool means are engageable with the work piece and follow a limacon-shaped path.

For a better understanding of the present invention reference should be had to the accompanying drawings, wherein like numerals of reference indicate similar parts throughout the several views and wherein:

FIG. 2 is a side elevational view taken along the line 2—2 of FIG. 1 in the direction of the arrows;

FIG. 3A is a side elevational view of the work piece, namely the inner housing for an impulse tool, provided with an accurately formed spindle blade guide aperture or cavity, and a spindle disposed therein;

FIG. 3B is a side elevational view of the crankshaft, dog and chuck;

FIG. 3C is a perspective of the crankshaft;

FIG. 4 is a schematic side elevational view of the inner housing and work tool, namely a grinding wheel, and illustrating the length (i.e. 2b plus the diameter of the grinding wheel) of the through type spindle blade used in the cavity;

FIGS. 5A–5D are schematic side elevational views showing the operation of the forming apparatus;

FIG. 6 is a schematic side elevational view similar to FIG. 2 illustrating the testing apparatus of the present invention.

Although the principles of the present invention are broadly applicable to forming and testing apparatus the present invention is particularly adapted for use in conjunction with the forming and testing of a spindle blade guide aperture in the inner housing of an impulse tool and hence it has been so illustrated and will be so described.

Figure 1:
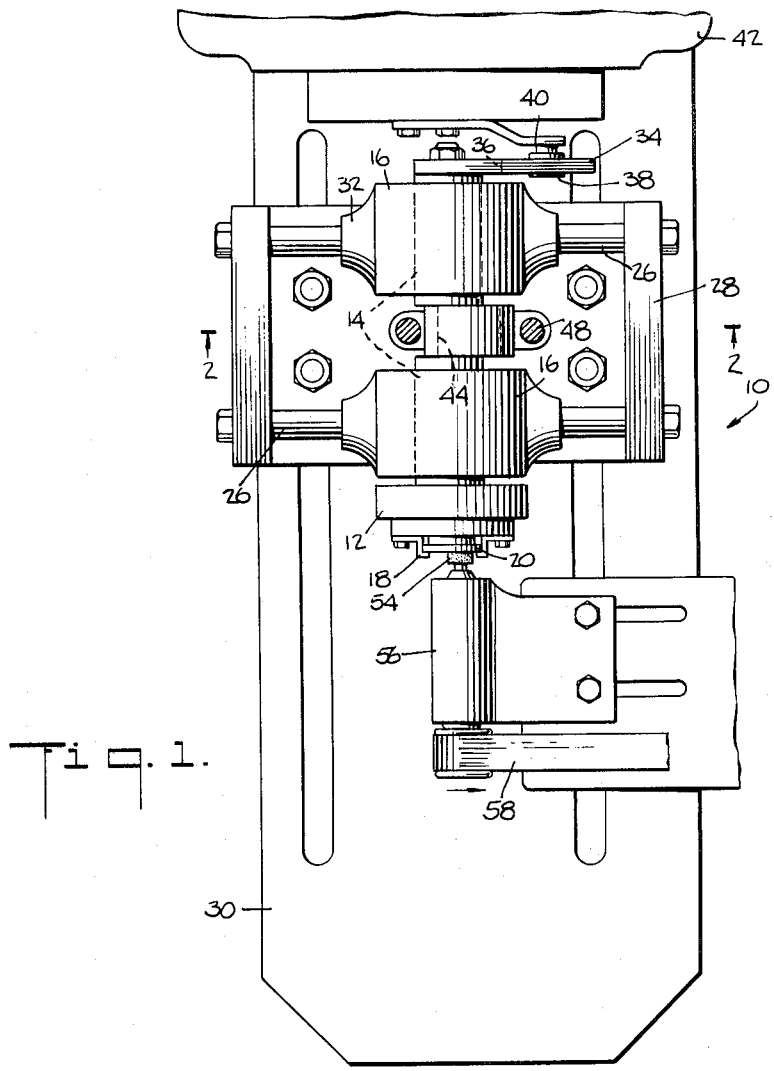
FIG. 1 is a plan view of the forming apparatus of the present invention.

With specific reference to the form of the present invention illustrated in the drawings, and referring particularly to FIGS. 1 and 2, a forming apparatus is indicated generally by the reference numeral 10.

*Work piece holding means*

The forming apparatus 10 has a work piece holding means which is adapted to reciprocate in a first plane, in this case (FIG. 2) a horizontal plane through a distance "2A." Such work piece holding means comprises a chuck 12 (FIG. 1) mounted on a crankshaft 14 (FIGS. 1 and 2) journalled in chuck bodies 16.

Figure 3:
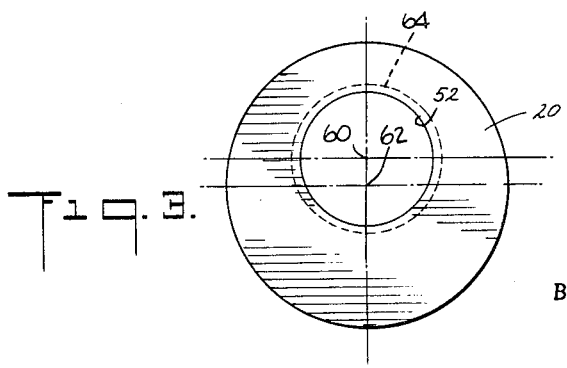
FIG. 3 is a side elevational view of the work piece, namely the inner housing for an impulse tool provided with a prebored hole and with the finished cavity or spindle blade guide aperture shown in dotted lines therein.

Such chuck 12 is provided with clamps 18 (FIG. 1) for retaining the work piece, such as an inner housing 20 (FIG. 3) in the work receiving aperture 22 (FIG. 3B) in the chuck 12. The chuck 12 (FIG. 3B) is mounted on one reduced end portion 24a of the crankshaft 14 by means of a bolt, washer and nut.

As shown in FIG. 1 the chuck bodies 16 are slidably mounted for reciprocating motion through a distance "2A" on horizontal slide rods 26 carried by a horizontal slide rod mounting bracket 28 (FIG. 2). The horizontal slide rod mounting bracket 28 is mounted on the lathe bed plate 30 (FIG. 2). As shown in FIG. 2 the hubs 32 on the chuck bodies 16 reciprocate between the dotted line positions of such hubs 32 through the above-mentioned distance "2A."

*Drive means*

In order to provide drive means connected to the work piece holding means (i.e. chuck 12) for rotating the chuck 12 and inner housing 20, a reduced shank portion 24b of the crankshaft 14 (FIGS. 3B and 3C) carries a dog 34 slotted at 36, which dog 34 is fixedly secured to the reduced shank portion 24b by a bolt, nut and washer. The dog 34 is driven by a roller 38 (FIG. 1) mounted on a roller arm 40 which is fixed to the rotating headstock 42 of the lathe. As will be seen from FIG. 1, the roller 38 engages the dog 34 to transmit rotation to the crankshaft 14 and rides along the dog 34 to permit horizontal reciprocating movement of the crankshaft 14.

*Positioning means and slide means*

Positioning means are connected to the work piece holding means (i.e. chuck 12, FIG. 1) and are adapted to rotate with the work piece holding means. In order to accomplish this the crankshaft 14 has an eccentric 44 (FIGS. 3B and 3C) journalled in a vertical slide 46 (FIG. 2) which slide 46 is reciprocable on vertical slide rods 48 which are secured at their lower ends to the mounting bracket 28 and which are integrated at their upper ends by a support plate 50. This vertical slide 46 reciprocates through a distance "2B" (FIG. 2) as indicated by the dotted line positions of the vertical slide 46 in such FIG. 2.

Work tool means

Referring to FIG. 1 work tool means are provided which are engageable with the prebored aperture 52 (FIG. 3) in the inner housing 20. The work tool means comprises a tool, such as the grinding wheel 54 (FIG. 1) polishing wheel or the like, carried by a tool chuck body 56 and rotated by conventional means such as the belt drive 58.

Operation

The inner housing 20 with its prebored aperture 52 (FIG. 3) (having its center at 60 and offset from the center 62 of the inner housing 20 and crankshaft 14) is inserted into the work receiving aperture 22 (FIG. 3B) of the chuck 12 and clamped therein by clamps 18 (FIG. 1). The rotatable grinding wheel 54 is inserted into the prebored aperture 52 for the purpose of forming a finished through type spindle blade guide aperture 64 (FIGS. 3 and 3A) having the shape of a limacon, the polar coordinate equation of which is $$\rho = b - a \cos \theta$$

where:

$\rho$ is the polar radius in inches $\theta$ is the polar angle in degrees and $a$ and $b$ are arbitrary desired constants measured in inches The above described forming apparatus moves the inner housing 20 through a limacon shaped path 66 (FIG. 4) so that the rotating but otherwise stationary grinding wheel 54 grinds the spindle blade guide aperture 64 (FIGS. 3 and 3A) into the inner housing 20. The length L of through type spindle blade 68 (FIG. 3A) carried by a spindle 70 is determined as follows:

$L$=Length of spindle blade 68 in inches=$(b+a)+(b-a)$ +diameter of grinding wheel=$2b$+diameter of grinding wheel in inches Referring to FIGS. 5A–5D, it will be noted that when the eccentric center 72, crankshaft and housing center 62 and grinding wheel center 74 are in the position shown in FIG. 5A $\theta$ is the angle of rotation of the eccentric 44 and $\rho$ is the distance in inches between crankshaft and housing center 62 and the grinding wheel center 74.

In such FIGS. 5A–5D.

$a$=distance in inches from the crankshaft and housing center 62 to the eccentric center 72 and $b$=distance in inches from the grinding wheel center 74 to the vertical path of movement (i.e. centerline) of the eccentric 44 or to the eccentric center 72, In FIG. 5A $\theta = 0°$ and $$\rho = b - a (\cos 0°)$$
$$= b - a$$

When $\theta = 90°$ as shown in FIGURE 5B:

$$\rho = b - a (\cos 90°)$$
$$\rho = b$$

In FIG. 5C $\theta = 180°$ and $$\rho = b - a (\cos 180°)$$
$$= b + a$$

Further at the end of 270° of rotation of eccentric 44 $\theta = 270°$ and $$\rho = b - a \cos 270°$$
$$= b$$

Alternative embodiments

Figure 7:
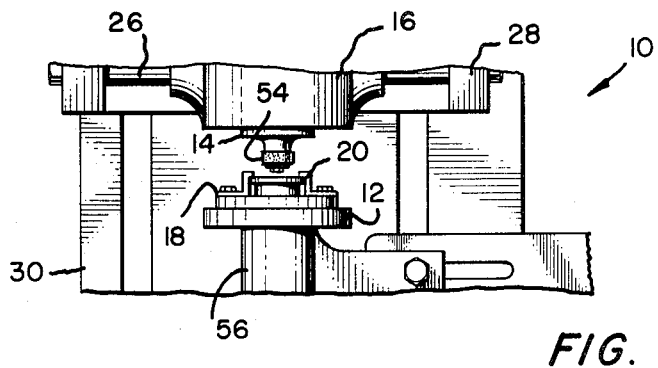
FIG. 7 is a fragmentary plan view similar to a portion of FIG. 1 illustrating a modified form of apparatus.

It will be understood by those skilled in the art that alternatively the inner housing 20 can be mounted, as shown in FIG. 7, on the tool chuck body 56 with its center coincident with the grinding wheel center 74 and the grinding tool 54 mounted in the chuck 12 so the grinding tool center coincides with the crankshaft center 62. In short the positions of the inner housing 20 and grinding tool 54 shown in FIG. 1 may be reversed.

Referring to FIG. 6 the contour of the through type spindle blade guide aperture 64 may be checked by the testing apparatus shown therein. In FIG. 6 the inner housing 20 is placed upon a surface plate 76, with a follower wheel 78 (mounted in the tool chuck body 56, FIG. 1) riding on the wall of the spindle blade guide aperture 64 and biased there against by spring biased pressure wheels 80.

An indicator 82 is mounted on the inner housing at 84 so its free end coincides with the inner housing center 62. The indicator 82 carries a stop 86 thereon and has its other end reciprocable in a slide 88, which slide 88 carries a micrometer 90. The other end of the slide 88 is pivoted at 92 in a sliding bushing 94 reciprocable on a slide rod 96.

With the distance between housing center 62 and pivot 92 set as equal to "$a$" the micrometer 90 is set against the stop 86 with a reading of zero.

Thereafter the inner housing 20 is rotated slowly by hand. Variations in the micrometer reading ± from the original zero setting of such micrometer 90 indicate the variation in inches in the contour of the limacon shaped aperture 64 from a true limacon.

It will be recognized by those skilled in the art that the objects of the present invention have been achieved by providing apparatus for forming and testing a cavity in the inner housing of an impulse tool, the apparatus being simply adjustable and capable of the easy testing of the finished contour in the cavity.

While in accordance with the patent statutes a preferred and alternative embodiment of the present invention has been illustrated and described in detail, it is to be particularly understood that the invention is not limited thereto or thereby.

I claim:

1. An apparatus for grinding a cavity in a workpiece to a limacon shape, said apparatus comprising:

a first rotatable shaft;

an eccentric carried by said first shaft for rotation therewith;

means for guiding said eccentric so that the axis of said eccentric moves in a first plane;

a second rotatable shaft rotatable about a stationary axis;

a grinding tool carried by one of said first and second shafts;

means for carrying said workpiece by the other of said first and second shafts with said grinding tool in the cavity therein;

the one of said grinding tool and said workpiece which is carried by said shaft being rotatable therewith;

means for guiding said first shaft so that the axis of said first shaft moves in a second plane normal to said first plane at a constant distance from the axis of said eccentric;

the one of said grinding tool and said workpiece which is carried by said second shaft being rotatable therewith and having its axis within said second plane and spaced a constant distance from the intersection of said first and second planes and spaced from the axis of the other of said grinding tool and said workpiece; and means operatively connected to said first and second shafts for rotating said first and second shafts.

2. An apparatus according to claim 1 wherein said grinding tool is carried by said first shaft and said workpiece is carried by said second shaft.

3. An apparatus for grinding a cavity in a workpiece to a limacon shape, said apparatus comprising:

a first rotatable shaft;

an eccentric carried by said first shaft for rotation therewith;

means for guiding said eccentric so that the axis of said eccentric moves in a first plane;

means for carrying said workpiece by said first shaft for rotation therewith;

means for guiding said first shaft so that the axis of said first shaft moves in a second plane normal to said first plane at a constant distance from the axis of said eccentric;

a second rotatable shaft;

a grinding tool carried by said second shaft for rotation therewith within the cavity of said workpiece;

said grinding tool having its axis within said second plane and spaced a constant distance from the intersection of said first and second plans and spaced from the axis of said workpiece throughout the movement thereof; and means operatively connected to said first and second shafts for rotating said first and second shafts.

4. An apparatus according to claim 3 wherein said first plane is a vertical plane and said second plane is a horizontal plane.

5. An apparatus according to claim 3 wherein the axis of the cavity in said workpiece is offset from the axis of said workpiece.

6. An apparatus according to claim 3 wherein said second shaft extends parallel to said first shaft and is rotatable about a fixed axis, and the diameter of the cavity is substantially twice the constant distance of the axis of the grinding tool from the intersection of said first and second planes plus the diameter of the grinding tool.

References Cited by the Examiner
UNITED STATES PATENTS

| | | | |
|---|---|---|---|
| 1,462,985 | 7/1923 | Schurr | 51—123 |
| 1,758,534 | 5/1930 | Porter | 51—93 |
| 2,580,989 | 1/1952 | Arms | 51—95 |
| 2,592,875 | 4/1952 | Durland | 51—93 |
| 2,746,159 | 5/1956 | Aller | 33—174 |
| 2,825,975 | 3/1958 | Cameron | 33—174 |

LESTER M. SWINGLE, *Primary Examiner.*